Patented Sept. 13, 1938

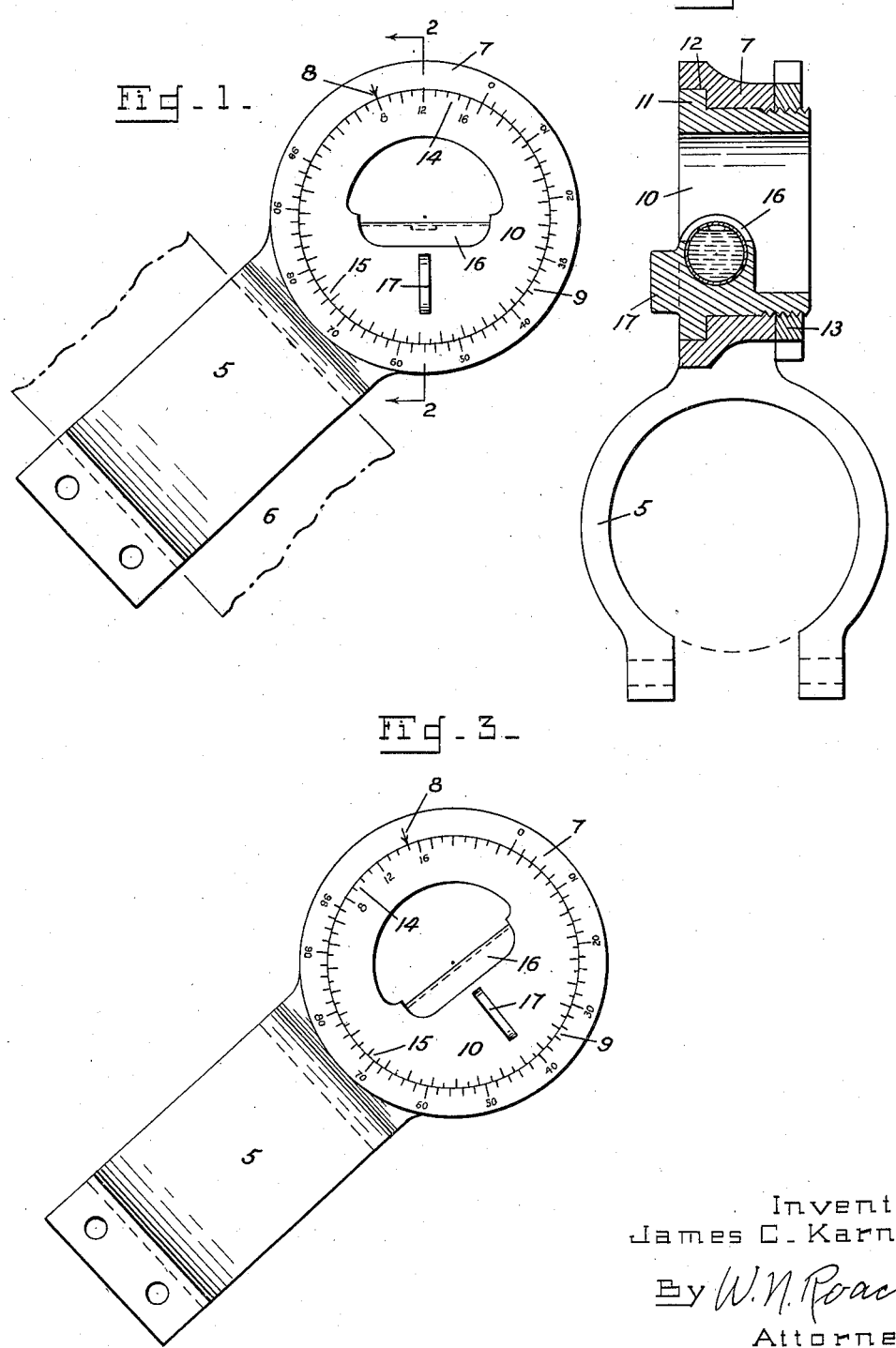

2,129,695

UNITED STATES PATENT OFFICE 2,129,695

CLINOMETER

James C. Karnes, Buffalo, N. Y.

Application October 6, 1937, Serial No. 167,603

2 Claims. (Cl. 33—214)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a clinometer.

The purpose of the invention is to provide a simple and inexpensive clinometer having medium requirements for exact manufacture and affording quick, easy, and accurate elevation setting.

The invention consists in providing a clinometer with a vernier scale which greatly expands a division of a major scale.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of a clinometer constructed in accordance with the invention.

Fig. 2 is a sectional view on the line 2—2 of Fig. 1.

Fig. 3 is a view in elevation showing the parts in position of adjustment near the maximum setting.

Referring to the drawing by characters of reference the clinometer comprises a support 5 which is conveniently in the form of an annular bracket adapted to be clamped onto a member such as a trench mortar 6 which is movable in elevation. The support includes a ring 7 whose front face is provided on its inner margin with an index 8 and with divisions of a vernier scale 9 designated from 0 to 98 and indicating mils in 2 mil increments. The vernier scale extends over three quadrants of the ring.

A cylindrical inner member 10 is rotatably mounted within the ring 7 and is held against axial displacement by means of a flange 11 formed on its front portion and seated in a recess 12 in the ring and by means of a thumbnut 13 which is threaded on its rear portion and is capable of being moved into contact with the rear face of the ring.

The front face of the inner member 10 is provided on a small portion of its outer margin with a normal scale 14 of divisions of angular values designated from 8 to 16, representing 800 to 1600 mils while the remainder of the margin is provided with a normal scale 15 of undesignated divisions. The scale 14 is arranged to be read against the index 8 and the scale 15 is read against the vernier scale 9.

The member 10 carries a spirit level 16 which is perpendicular to a diametral line passing through the center of the scale 14. A projecting fingerpiece 17 is provided on the member 10 and is adapted to be acted on to rotate the member when it is not clamped by the thumbnut 13.

In Fig. 1, the mortar 6 is shown at an elevation of 800 mils exactly, and with the spirit level centered, the scale 14 shows the 800 mil graduation in line with the index 8 and the first graduation of the scale 15 registers with the zero graduation of the vernier scale 9. In order to set the clinometer for 850 mils, it is only necessary to rotate the member 10 in a counterclockwise direction through a part of a division of the scale 15 until the graduation of this scale which follows the 50 graduation on the vernier scale is brought into register with said 50 graduation. This operation inclines the spirit level 16, and in restoring it to center the bubble by movement of the mortar, the mortar will be set to an elevation of 850 mils.

Because of the relatively great angular displacement of the member 10 in setting the higher readings of the scale 14, as shown in Fig. 3 it is necessary to extend the scale 15 beyond the vernier scale to allow for registering of the graduations between the 80 and 98 reading of the vernier scale. The excess length of the scale 15 should be substantially equal to the length of the scale 14.

The index 8 and the scale 14 may be placed on either the outer ring 7 or the inner rotatable member 10. The structure may also be reversed so that the outer member is arranged for rotation and carries the spirit level.

I claim:

1. A clinometer including an outer ring having an index and a vernier scale with designated divisions from 0 to 98, and an inner member rotatably mounted in the outer ring, said member having over a small portion of its margin a normal scale of designated divisions of angular values readable against the index and having over a large portion of its margin a normal scale with undesignated divisions readable against the vernier scale, a spirit level carried by the inner member, and means for clamping the inner member in position of adjustment.

2. A clinometer including a pair of annular members, one being relatively fixed and the other rotatable with respect to the fixed member, an index on one member, a normal scale of designated divisions of angular values on the other member and readable against the index, a vernier scale of designated divisions on the fixed member, and a normal scale of undesignated divisions on the rotatable member and readable against the vernier scale, said normal scale of undesignated divisions having a length greater than the vernier scale by an amount substantially equal to the length of the normal scale of designated divisions, and a spirit level carried by the rotatable member.

JAMES C. KARNES.